United States Patent [19]

Andres

[11] 3,880,364

[45] Apr. 29, 1975

[54] SAFETY BELT SYSTEM WITH A WIND-UP ROLLER HAVING A SPRING-LOADED SHAFT

[75] Inventor: Rudolf Andres, Sindelfingen, Germany

[73] Assignee: Daimler-Benz Aktiengesellschaft, Stuttgart, Germany

[22] Filed: Apr. 26, 1973

[21] Appl. No.: 354,783

[30] Foreign Application Priority Data

Apr. 27, 1972 Germany.......................... 2220669

[52] U.S. Cl...... 242/107.4; 180/82 C; 200/61.58 B; 280/150 SB; 297/388
[51] Int. Cl. ..................... A62b 35/02; B65h 75/48
[58] Field of Search ...... 242/107, 55; 297/385, 386, 297/387, 388; 280/150 SB; 200/61.58 SB; 180/82.8; 244/122

[56] References Cited
UNITED STATES PATENTS

| | | | |
|---|---|---|---|
| 2,905,231 | 9/1959 | Olson | 280/150 SB |
| 3,022,089 | 2/1962 | Botar | 280/150 SB |
| 3,182,923 | 5/1965 | Botar | 242/55 |
| 3,190,694 | 6/1965 | Isaac | 297/388 |
| 3,248,149 | 4/1966 | Carter | 242/107.4 |
| 3,653,714 | 4/1972 | Gentile | 297/388 |

*Primary Examiner*—Billy S. Taylor
*Attorney, Agent, or Firm*—Craig & Antonelli

[57] ABSTRACT

A safety belt system which includes a belt wind-up roller device equipped with a spring-loaded shaft for use in vehicles, especially in motor vehicles, in which the spring-loaded shaft is coupled with a servo-drive; the servo-drive, in turn, is controlled by a switching member and forces the attached safety belt against the body of the user under a substantially constant pre-stress still tolerable by the user in all seating positions.

18 Claims, 1 Drawing Figure

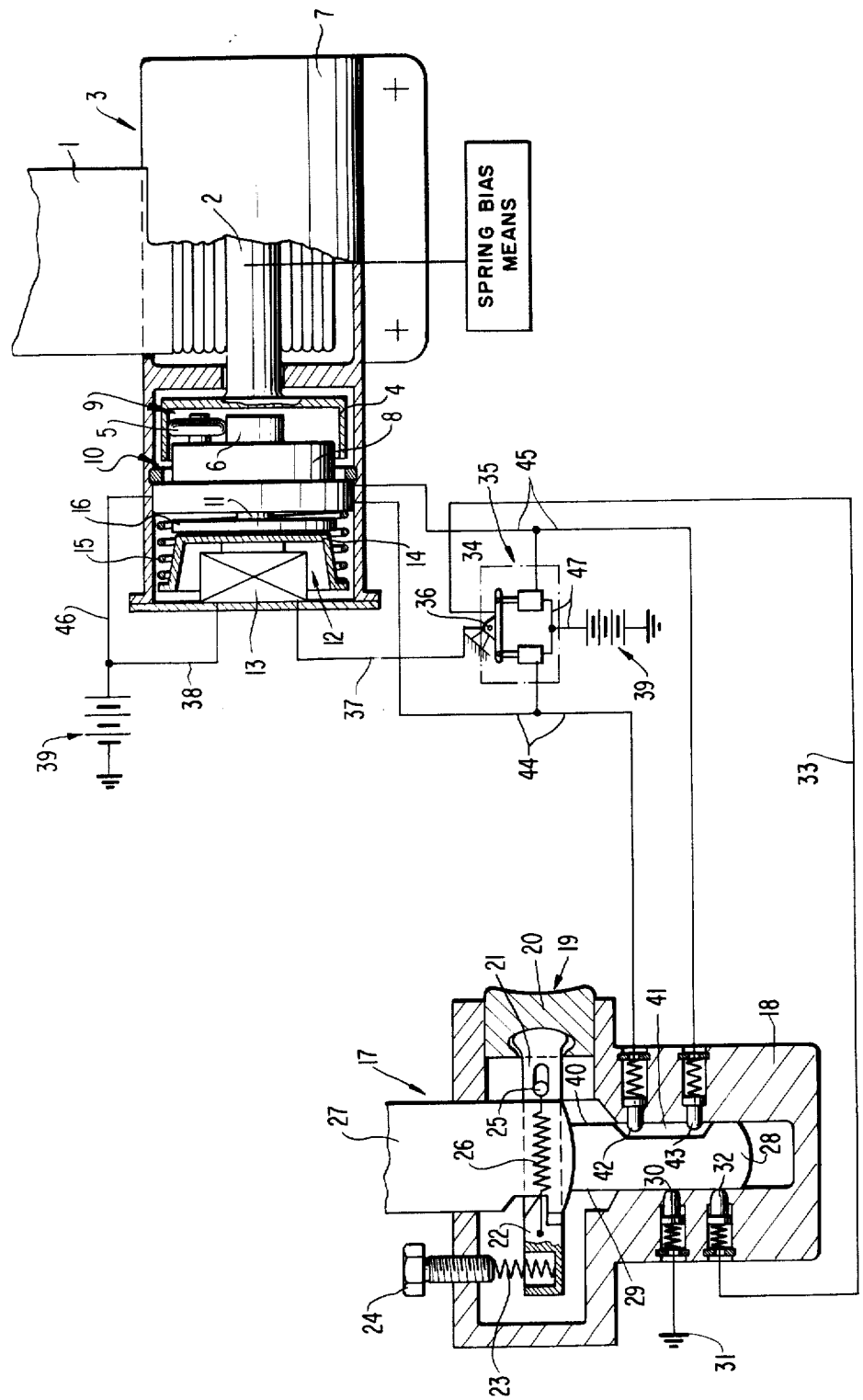

SAFETY BELT SYSTEM WITH A WIND-UP ROLLER HAVING A SPRING-LOADED SHAFT

The present invention relates to a safety belt system with a belt wind-up roller having a spring-loaded shaft for vehicles, especially for motor vehicles.

The wind-up roller mechanisms in safety belts serve, inter alia, the purpose to cause the belt to abut always at the body during use since only then there exists the assurance that as large as possible a brake path is available to the user during strong decelerations. The prior art belt wind-up roller devices are constructed for the most part in such a manner that for reaching a part which is located more remote in the vehicle, the wound-up or rolled-up belt is unwound or uncoiled when the retaining force produced by a spring is uniformly exceeded, whereas during a sudden, jerk-like load of the belt band, a locking device becomes effective which releases the wound-up belt band under energy absorption only upon reaching a predetermined force which is still barely tolerable for the user.

However, the relatively high retaining force which acts continuously on the body is deemed disagreeable or annoying by many users so that frequently one has gone over to construct the restoring spring as weak as possible. This, however, has as a consequence that the belts are not always completely wound up in the non-used condition and lie around in the vehicle in a disorderly manner.

It has therefore been already proposed to provide a device, by means of which the wind-up roller device can be blocked with an attached belt. The possibility exists in that case to attach the belt more or less loosely. However, during an accident it is of extreme importance that the belt does not abut loosely at the body of the user but abuts at least under a slight prestress at the body of the user.

Starting with this recognition, it is the aim of the present invention to provide in safety belt systems equipped with a belt wind-up roller mechanisms, a device which retracts or pulls back the belt band, when the belt is attached, with a uniform force independently of the length of the pulled-out belt and which is not noticed by the user as unpleasant and annoying. Furthermore, the freedom of movement of the passengers is not to be impaired by the device of the present invention while the belt band is to be wound up with a large force during non-use of the belt.

Consequently, a safety belt system with a belt wind-up roller for vehicles, especially for motor vehicles, having a spring-loaded shaft is proposed in which according to the present invention, the spring-loaded shaft is coupled with a servo-drive which—initiated or controlled by a shifting member—presses the attached safety belt in all seat positions against the body of the person using the belt under a prestress which remains constant and is tolerable by the user.

In a preferred embodiment of the present invention, the servo-drive is constructed as electric motor with two shaft ends whereby the shaft end near the belt wind-up roller device is operatively connected with the spring-loaded shaft by way of a planetary gear-like friction wheel transmission whereas the shaft end remote from the belt wind-up roller device cooperates with a disengageable coupling or clutch.

According to a further feature of the present invention, the disengageable coupling or clutch may consist of an electro-magnet which, in the energized condition, forces a friction disk secured against rotation, overcoming the force of a spring, against a disk which forms the shaft end remote from the belt wind-up roller device.

It is possible to arrange the shifting member at deflection or fastening places of the belt system.

However, the shifting member may also be advantageously connected with the belt wind-up roller mechanism.

In a preferred manner, the shifting member forms a part of the belt lock and includes, adjoining a latching mechanism adapted to be loaded or stressed by a spring having preferably a changeable prestress, a contact tongue whose one narrow side is operatively connected with the vehicle ground by way of a sliding contact and establishes a connection to a line leading to the electromagnet and whose other narrow side is provided with a recess or indentation which has such a longitudinal dimension that in the center position of the contact tongue two associated or coordinated contacts are not in contact therewith.

The contacts act whereby advantageously on a two-coil relay of conventional construction and connected with the positive terminal of the vehicle battery which, in the energized condition, interrupts the energizing circuit of the electromagnet.

Accordingly, it is an object of the present invention to provide a safety belt system with a belt wind-up roller mechanism which avoids by simple means the aforementioned shortcomings and drawbacks encountered in the prior art.

Another object of the present invention resides in a safety belt system with a wind-up roller device having a spring-loaded shaft that eliminates the disagreeable sensation of an excessive abutment force of the belt at the body of the user, yet is highly effective for its intended purposes to maximize the available brake path.

A further object of the present invention resides in a safety belt system with a belt wind-up roller device having a spring-loaded shaft that avoids excessive tensioning forces at the belt yet assures a complete wind-up of the belt when not used, thus eliminating the possibility that the belt or belts will lie around in a disorderly fashion.

Still a further object of the present invention resides in a safety belt system of the type described above which assures that the belt abuts at the body of the user always under slight prestress yet the return force remains constant independently of the length of the pulled-out belt.

Another object of the present invention resides in a safety belt system with a spring-loaded belt wind-up roller device which does not impair the freedom of movement of the passenger yet provides a sufficiently large force to assure complete wind-up of the belt during non-use thereof.

Still another object of the present invention resides in a safety belt system having a spring-loaded belt wind-up roller device for motor vehicles in which the safety belt presses against the body of the user at a still tolerable prestress which remains substantially constant in all seat positions.

These and other objects, features and advantages of the present invention will become more apparent from the following description when taken in connection with the accompanying drawing which shows, for purposes of illustration only, one embodiment of the present invention, and wherein:

The single FIGURE is a somewhat schematic cross-sectional view through a safety belt system in accordance with the present invention.

Referring now to the single FIGURE of the drawing, a belt end 1 of a safety belt system, not shown in detail and of any conventional construction is wound up on the spring-loaded shaft 2 of a belt wind-up roller device generally designated by reference numeral 3. The free end of the shaft 2 passes over into a cup wheel 4. A friction wheel 5 runs along the inner rim of the cup wheel 4, with which it is in frictional engagement. The friction wheel 5 is driven by the shaft end 6 near the belt wind-up roller device 3 of an electric D.C. motor 8 secured within the housing 7 of the belt wind-up roller device 3 and reversible in its direction of rotation. The force transmission device described so far represents a planetary gear-like friction wheel transmission generally designated by reference numeral 9 whereas the electric motor 8 acts as a part of a servo-drive generally designated by reference numeral 10. The servo-drive 10 further includes a shaft end 11 remote from the belt wind-up roller device 3, which cooperates with a disengageable coupling or clutch generally designated by reference numeral 12 which consists of an electromagnet 13 which in the energized condition forces a friction disk 14 secured against rotation against a disk 16 while overcoming the force of a spring 15 supported at the friction disk 14 and at the housing of the electric motor 8, which disk 16 forms the end portion of the shaft end 11.

The servo-drive is influenced by a shifting member generally designated by reference numeral 17 which in the illustrated embodiment forms a part of the belt lock 18 connected with the belt system in a conventional manner (not shown). A latching mechanism generally designated by reference numeral 19 essentially consists of a guided push button 20 into which is inserted a slide member 21 with a pawl 22. The free end of the slide member 21 is acted upon by a spring 23 whose prestress is adjustable by an adjusting bolt or screw 24. A pin 25 projecting from the belt lock 18 limits the displacement movement of the slide member 21 and serves as center of gravity during a change of the prestress of the spring 23. In order that the belt lock 18 is retained in the illustrated latched position, a spring 26 pulls the slide member 21 in the direction toward the push button 20. A latching prong 27 slidable into the housing of the belt lock 18 and otherwise of customary construction is provided with a contact tongue 28 whose one narrow side 29 is operatively connected with the vehicle ground 31 by way of a sliding contact 30. The contact tongue 28 establishes by way of a current pick-up 32 and a line 33 a connection to the switching bridge 34 of a two-coil relay generally designated by reference numeral 35 and of conventional construction whereby with a de-energized relay 35 current flows to the electromagnet 13 by way of a contact 36 and a line 37 connected thereto, which electromagnet 13 is connected with the positive terminal of the vehicle battery 39 by way of a line 38. The other narrow side 40 includes an indentation or recess 41 which has such a longitudinal dimension that in the center position of the contact tongue 28, the two contacts 42 and 43 are out of contact with the contact tongue 28. A line 44 leads from contact 42 to the electric motor 8 with a branched connection to one of the two coils of the relay 35, whereas a line 45 leads from contact 43 also to the electric motor 8 with inclusion of a branched connection to the other coil of the relay 35; the electric motor 8 is connected with the vehicle battery 39 by way of a line 46, while both coils of the relay 35 are also connected with the battery 39 by way of a line 47. The lines 44 and 45 thereby are connected in such a manner with the electric motor 8 of conventional construction that a reversal of rotation is possible by selective energization of one of the other lines.

In the illustrated position, the belt abuts in a manner not illustrated herein under a slight tension corresponding to the prestress of the spring 23 at the body of the user. The relay 35 is de-energized and the electromagnet 13 which is energized forces the friction disk 14 against the disk 16 whereby the belt wind-up roller 3 is blocked.

If the user wants to reach, for example, an actuating knob disposed further away within the interior of the vehicle and, for that purpose, leans forwardly, then the latching prong 27 and together with the same the contact tongue 28 moves outwardly against the force of the spring 23. During this operation, the slide member 21 is caused to assume an inclined position and the contact 43 is caused to abut at the contact tongue 28. As a result thereof, the relay 35 is energized and the switching bridge 34 disengages from the contact 36 in a conventional manner whereby the electromagnet 13 is no longer energized. The spring 15 now moves the friction disk 14 in the direction of the electromagnet 13 and thus lifts the blocking action of the electric motor 8. The latter is connected with ground by way of the contact 43 and the line 45 and then rotates with a direction of rotation which leads to a winding off of the belt end 1. This operation lasts for such length of time until the illustrated center position of the contact tongue 28 is again reached in which the safety belt abuts at the body with the original prestress.

If the attached belt becomes loose, which may take place, for example, when sliding back the seat or when returning from a forwardly bent position into the normal seating position, then the spring 23 forces the contact tongue 28 further into the belt lock 18 until the contact 42 abuts at the contact tongue 28. The relay 35 is now again energized, and the shifting bridge 34 is again disengaged from the coordinated contact 36. As a result thereof, the electromagnet 13 is again de-energized and the blocking of the electric motor 8 is again lifted. The latter is now connected with the vehicle ground 31 by way of the line 44 and the contact 42 abutting at the contact tongue 28 whereby the electric motor 8 rotates with a direction of rotation which now leads to a winding up of the belt-end 1. This operation again lasts for such length of time until the illustrated center position of the contact tongue 28 and thus the original conditions are again re-established.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A safety belt system comprising:
a safety belt,
belt wind-up roller means for winding-up at least one end of said safety belt, said belt wind-up roller means including a shaft on which the safety belt is wound,
servo-drive means for reversibly driving said shaft, thereby providing one of winding-up said safety belt on said shaft and winding-off said safety belt from said shaft, and
control means for controlling said servo-drive means such that said servo-drive means drives said shaft to force said safety belt at all times against the body of a user under a substantially constant tension, said constant tension being tolerable to the user, wherein said servo-drive means comprises an electric motor having two shaft ends, a friction wheel transmission means for driving said shaft of said belt wind-up roller means with one of said two motor shaft ends, and disengageable means for selectively disengaging said electric motor from driving said shaft of said belt wind-up roller means.

2. A safety belt system according to claim 1, wherein said disengageable means is a clutch.

3. A safety belt system according to claim 1, wherein said disengageable means comprises a friction disk fixed to prevent rotation thereof, a second disk fixed to the other of said two motor shaft ends, spring means for holding said friction disk away from said second disk, and electro-magnetic means for forcing said friction disk against said second disk upon energization of said electro-magnetic means, such that the force of said spring means is overcome.

4. A safety belt system according to claim 3, wherein said control means includes a shifting means for providing a shifting electrical connection in said control means.

5. A safety belt system according to claim 4, wherein said shifting means is at a portion of said safety belt which is deflected in accordance with different seating positions of the user.

6. A safety belt system according to claim 4, wherein said shifting means is at a place where the belt system is fastened.

7. A safety belt system according to claim 4, wherein said shifting means is connected with said belt wind-up roller means.

8. A safety belt system according to claim 4, further comprising a belt lock means for latching said safety belt in the belt system, wherein said belt lock means comprises a latching means for providing latching of said safety belt, said shifting means forming a part of said latching means.

9. A safety belt system according to claim 8, wherein said shifting means includes a contact means for establishing an electrical connection of said control means, said contact means being a sliding contact having a first portion providing a connection between ground and said electro-magnetic means, and said sliding contact having a second portion providing one of alternate connection with the respective reversible drive positions of said electric motor and no connection with said electric motor.

10. A safety belt system according to claim 9, wherein said latching means includes a male latching member connected to said sliding contact.

11. A safety belt system according to claim 8, wherein said latching means includes an adjustable spring means for providing a spring bias on said latching means such that said safety belt is latched with a predetermined tension, said spring bias being adjustable.

12. A safety belt system according to claim 9, wherein two separate contact means are provided for alternate connection with said second portion of said slide contact, thereby providing connection with respective reversible drive positions of said electric motor, said two separate contact means further being connected to a source of electric energy through a relay means, said relay means being operable to interrupt the energization of said electro-magnetic means.

13. A safety belt system according to claim 12, wherein said disengagement means is a clutch.

14. A safety belt system according to claim 1, wherein said control means includes a shifting means for providing a shifting electrical connection in said control means.

15. A safety belt system according to claim 14, further comprising a belt lock means for latching said safety belt in the belt system, wherein said belt lock means comprises a latching means for providing latching of said safety belt, said shifting means forming a part of said latching means.

16. A safety belt system according to claim 15, wherein said shifting means includes a contact means for establishing an electrical connection of said control means to said servo-drive means, said contact means being a sliding contact having a first portion providing a connection between ground and said servo-drive means, and each sliding contact having a second portion providing one of alternate connection with the respective reversible drive positions of said servo-drive means and no connection with said servo-drive means.

17. A safety belt system according to claim 16, wherein two separate contact means are provided for alternate connection with said second portion of said slide contact, thereby providing connection with respective reversible drive positions of said servo-drive means, said two separate contact means further being connected to a source of electric energy through a relay means, said relay means being operable to reverse the energization of said servo-drive means.

18. A safety belt system according to claim 16, wherein said latching means includes an adjustable spring means for providing a spring bias on said latching means such that said safety belt is latched with a predetermined tension, said spring bias being adjustable.

* * * * *